Oct. 11, 1960 W. T. MOORE 2,955,827

GUIDE MEANS FOR PHONOGRAPH NEEDLE

Filed Aug. 28, 1959

INVENTOR

William T. Moore.

BY W. J. Eccleston

ATTORNEY

United States Patent Office 2,955,827
Patented Oct. 11, 1960

2,955,827

GUIDE MEANS FOR PHONOGRAPH NEEDLE

William T. Moore, West Point, N.Y.
(15 Ondaora Park, Highland Falls, N.Y.)

Filed Aug. 28, 1959, Ser. No. 836,831
18 Claims. (Cl. 274—13)
(Granted under Title 35, U.S. Code (1952), sec. 266)

The invention described herein, if patented, may be manufactured and used by or for the Government for governmental purposes, without the payment to me of any royalty thereon.

The invention relates to phonographic sound pickup devices such as a stylus and a tone arm or the like. As is well known, when the one or more of the convolutions of the spiral sound groove become damaged as by a scratch, the stylus tends to leave the convolution by passing through the gap in the wall of the groove which has been created by the scratch. As a result, the stylus repeats this performance at each encounter with the gap, remains in the same convolution and keeps repeating the sounds thereof until the stylus is manually held in the groove until past the gap.

With the foregoing in view, it is an object of the invention to provide novel guide means which is operative to prevent the stylus from escaping from the groove through a scratch or the like.

A further object is to provide novel guide means for the stylus which rides in the spiral groove either ahead or behind the stylus to prevent the latter from escaping from the groove.

A further object is to provide such a guide means which is normally not in contact with the walls or floor of the groove but which immediately engages a groove wall as soon as the stylus commences its lateral movement into a scratch whereby to hold the stylus in the groove.

Other objects and advantages reside in the particular structure of the invention, the structure of the several elements of the same, combinations and sub-combinations of such elements with each other and/or with a stylus, with a tone arm or with the groove of a sound record, all of which will be readily apparent to those skilled in the art upon reference to the attached drawing which illustrates a number of species of the invention and to the following specifications wherein the invention is described and claimed.

Figures 1, 2, 3, 4, 5, 6, 7:
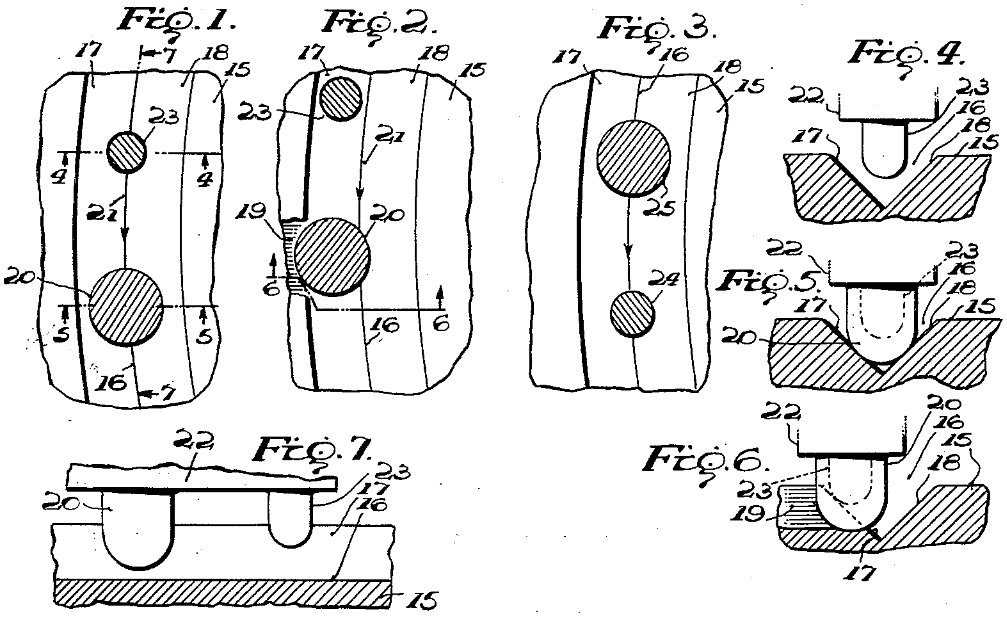
Figure 1 is a fragmentary, diagrammatic, horizontal sectional view showing a stylus and guide according to one species of the invention traveling in a normal groove of a sound record.
Figure 2 is a view like Figure 1 but showing the stylus attempting to leave the groove through a gap in the wall thereof.
Figure 3 is a view like Figure 1 but showing a second species of the invention.
Figures 10, 11, 12:
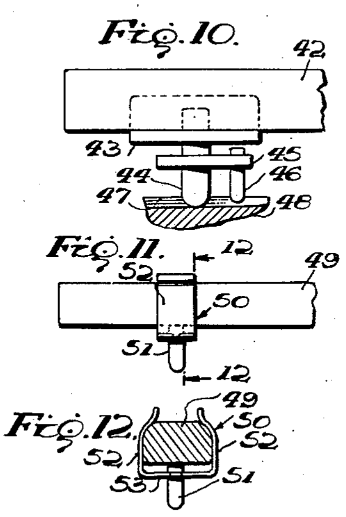
Figures 13, 14:
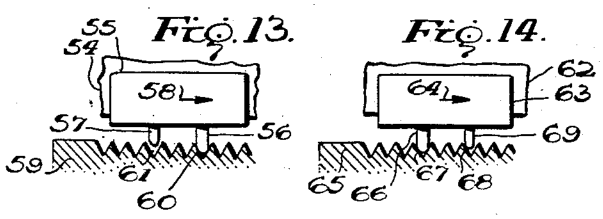

Figures 4 and 5 are respectively vertical sectional views taken on the planes of the lines 4—4 and 5—5 of Figure 1;

Figure 6 is a vertical sectional view taken on the planes of the line 6—6 of Figure 2;

Figure 7 is a longitudinal sectional view taken substantially on the plane of the line 7—7 of Figure 1;

Figures 8, 9, 10 and 11 are fragmentary diagrammatic elevational views on a reduced scale showing four modifications of the invention;

Figure 12 is a vertical sectional view taken substantially on the planes of the line 12—12 of Figure 11;

Figure 13 is a diagrammatic end elevational view of a further modification of the invention;

Figure 14 is a view like Figure 13 of a still further modification; and

Figures 8, 9, 15:
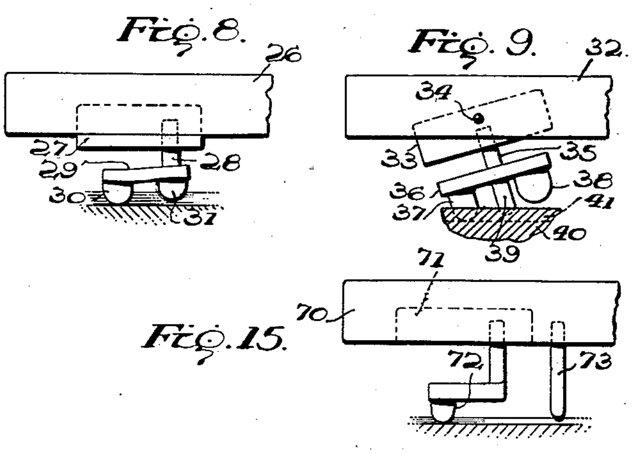

Figure 15 is a fragmentary diagrammatic elevational view of another modification of the invention.

Referring specifically to the drawing, wherein like reference characters designate the same parts in all views, and referring at first to the species of Figures 1, 2 and 4–7, inclusive, 15 designates any suitable sound record having a helical groove 16 including converging side walls 17, 18. The side wall 17 may have a gap 19 therethrough, Figures 2 and 6, such as would be formed by a scratch. The reproducing stylus is designated by 20 and, when the record 15 is rotating in the direction of the arrow 21, Figure 2, the stylus will tend to pass through the gap 19 whereby to continue to in the same convolution in a well-known manner. The stylus 20 is mounted in any suitable manner on a tone arm or the like 22 which likewise mounts the guide 23 of the invention.

Guide 23, in this species of the invention, is a stylus-like device which is mounted ahead of the stylus 20. Guide 23 may be shorter than the stylus 20 so that it will not normally contact the walls 17, 18 of the groove or the floor thereof if used with a groove having a U-shape. By being aligned with the stylus 20, the guide 23 is automatically centered in the groove 16 whenever the stylus is seated therein. Where the groove walls 17 and 18 are intact, normally guide 23 will never contact such side walls. Likewise the guide 23 is not affected by gaps in the side walls 17 and 18. When the stylus 20 encounters a gap such as 19, it will endeavor to pass therethrough to the beginning of the convolution thereby defined. However, as soon as the stylus 20 moves laterally to pass through the gap 19, the guide 23 will engage the side wall 17 ahead of the stylus and prevent further lateral movement whereby the stylus 20 is prevented from passing through the gap 19 and is forced to continue in the normal manner. The effect is the same as the pressure of an operator's finger on the tone arm which is the normal procedure for getting the stylus 20 past the gap 19. However, of course, guide 23 functions automatically even though the scratch may extend through the walls of several convolutions of the groove 16.

In the species of Figure 3, the structure is the same except that the guide 24 is located behind the stylus 25 and trails the same. It operates in the same manner as does the first-described species.

In Figure 8 the tone arm or the like 26 mounts the usual pick-up cartridge 27, which in turn mounts a leg 28 of an L-shaped member which includes a downwardly inclined foot 29 from which depend the stylus 30 and guide 31 which are in longitudinal alignment. Here, the guide 31 and stylus 30 are the same size but because of the inclination of foot 29 the guide does not extend entirely into the groove. Guide 31 is on the axis of leg 28, whereby not to be susceptible of much lateral movement of stylus 30 caused by undulations in the walls of the groove on account of the inherent flexibility of foot 29. However, guide 31 will function as described when stylus 30 attempts to move out of the groove through a gap.

Figure 9 shows the invention applied to a dual tip type of device which is used in order to provide means for playing both regular and long-playing records. Here the tone arm 32 has a pick-up cartridge 33 pivoted thereto on the transverse pivot 34. Cartridge 33 has depending therefrom the leg 35 of an inverted T-shaped member the runner 36 of which mounts at one end a stylus 37 for playing regular records and, at the other end, a stylus 38 for playing long-playing records. Between the styluses 37 and 38 and in alignment therewith and with the leg 35 is a guide 39. As is apparent, irrespective of which stylus 37 or 38 is in the groove 41 of the record 40, the guide 39 which will be located therein so as to function in the manner previously described.

In Figure 10, the tone arm 42 mounts the usual pick-up cartridge 43 which in turn mounts the usual stylus 44. Here an arm 45 is fixed to the stylus 44 so as to extend therefrom in upwardly spaced, parallel relation to the record 48 and in aligned relation to the groove 47 thereof. Guide 46 is fixed to the arm 45 in any suitable manner so as to extend into the groove 47 for functioning in the manner described before.

In Figures 11 and 12, a tone arm or the like 49 has a spring clip 50 readily detachably secured thereto by the spring arms 52 thereof. The web 53 of the clip 50 has a guide 51 fixed thereto in any suitable manner so as to depend therefrom and function as in the earlier described species.

In Figure 13, the tone arm 54 mounts a pick-up cartridge 55 which mounts a stylus 56. It also mounts a guide 57 which is disposed laterally outwardly of the stylus 56. Thus, as the tone arm 54 moves in the direction of the arrow 58 across the record 59, the stylus 56 is in a convolution 60 which is radially inwardly of the convolution 61 in which the guide 57 is located.

Figure 14 shows the reverse arrangement from Figure 13. Here, the tone arm 62 and a cartridge 63 are moving across the record 65 in the direction of the arrow 64. As before, both the stylus 66 and guide 69 depend from the cartridge 63 in laterally spaced relation. However, now the guide 69 is laterally inwardly of the stylus 66 so that the latter rides in a convolution 67 which is radially outside of the convolution 68 which receives the guide 69.

Figure 15 shows a conventional tone arm 70, pick-up cartridge 71 and stylus 72. Here, the guide 73 is secured in any suitable manner to the tone arm 70 so as to be in longitudinal alignment with the stylus 72 and to be received in the same convolution of the groove.

It is understood that all of the aforesaid species of the invention function in the same manner as in the first-described embodiment of the invention and that the guide does not engage the floor or side walls of the record groove until the stylus attempts to move laterally out of a convolution through a gap such as that 19. When this occurs, the guide will engage a side wall of the convolution and force the stylus back into the same.

It is true that previous devices have utilized tandem styluses to get special musical effects, and that these have an inherent ability to function like the device of the invention. However, these devices have the disadvantage of causing more wear on the record and even if the extra needle is not phonetically connected to the tone arm and is not used to pick up sounds, it will cause a scratching noise in addition to unduly wearing the record.

While a number of species of the invention have been shown and described hereinabove, it is understood that the invention is susceptible of still other forms and expressions. Consequently, the invention is not considered as being limited to the precise structures shown and described hereinabove but only as hereinafter claimed.

I claim:

1. In a phonographic sound pick-up device including a tone arm or the like having a reproducing stylus mounted thereon to pick up sounds from the convolutions of a spiral groove of a sound record, said groove being defined by groove walls; the improvement comprising a guide for retarding radial movement of said stylus out of said groove, said guide including a guide portion, means mounting said guide on said tone arm adjacent said stylus and with said guide portion within the same convolution of said groove, and said guide portion being sized and disposed to be normally spaced from said walls of said groove.

2. In a phonographic sound pick-up device including a tone arm or the like having a reproducing stylus mounted thereon to pick up sounds from the convolutions of a spiral groove of a sound record, said groove being defined by groove walls; the improvement comprising a guide for retarding radial movement of said stylus out of said groove, means mounting said guide on said tone arm adjacent said stylus and within the same convolution of said groove, said guide comprising a needle which is shorter than said stylus, and said needle being disposed in said groove so as to be normally out of contact with said walls.

3. In a phonographic sound pick-up device including a tone arm or the like having a reproducing stylus mounted thereon to pick up sounds from the convolutions of a spiral groove of a sound record, said groove being defined by groove walls; the improvement comprising a guide for retarding radial movement of said stylus out of said groove, means mounting said guide on said tone arm adjacent said stylus and within the same convolution of said groove, said guide comprising a member which is shorter than said stylus, and said member being normally disposed within said groove in spaced relation to said walls of the same.

4. A device according to claim 1, wherein said guide is disposed in said convolution in front of said stylus.

5. A device according to claim 1, wherein said guide is disposed in said convolution behind said stylus.

6. In a phonographic sound pick-up device including a tone arm or the like having a reproducing stylus mounted thereon to pick up sounds from the groove-defining walls of the convolutions of the spiral groove of a sound record; the improvement comprising a guide for retarding radial movement of said stylus out of said groove, means mounting said guide on said tone arm adjajcent said stylus but laterally thereof and within another convolution of said groove, and said guide being normally in spaced relation to said walls of said groove.

7. In a phonographic pick-up device including a tone arm or the like mounting a reproducing stylus thereon to pick up sounds from a sound record having a groove including a plurality of convolutions having two side walls; the improvement comprising a guide for retarding lateral movement of said stylus out of said groove, means mounting said guide on said tone arm adjacent said stylus and within said groove, and said guide being sized and disposed to be normally spaced from both of said walls of said groove.

8. In a phonographic pick-up device including a tone arm or the like mounting a reproducing stylus thereon to pick up sounds from a sound record having a groove including a plurality of convolutions having side walls; the improvement comprising a guide for retarding lateral movement of said stylus out of said groove, means mounting said guide on said tone arm adjacent said stylus and within said groove, and said guide being shorter than said stylus whereby to be normally spaced from said side walls of said groove.

9. In a phonographic pick-up device including a tone arm or the like mounting a reproducing stylus thereon to pick up sounds from a sound record having a groove including a plurality of convolutions having side walls; the improvement comprising a guide for retarding lateral movement of said stylus out of said groove, means mounting said guide on said tone arm adjacent said stylus and within said groove, said guide having a free end normally disposed between said side walls of said groove and in spaced relation thereto, and said free end of said guide being adapted to contact one wall of said groove upon lateral movement of said stylus relative said groove.

10. The structure of claim 9, wherein said guide and stylus are disposed in the same convolution of said groove.

11. The structure of claim 9, wherein said guide is disposed in the same convolution of said groove as said stylus in forwardly spaced relation to the latter.

12. The structure of claim 9, wherein said guide is disposed in the same convolution of said groove as said stylus in rearwardly spaced relation to the latter.

13. The structure of claim 9, wherein said guide is disposed in a convolution of said groove other than that in which said stylus is located.

14. The structure of claim 9, wherein said guide is located ahead of said stylus and in a convolution of said groove other than that in which said stylus is located.

15. The structure of claim 9, wherein said guide is disposed behind said stylus and in a convolution of said groove other than that in which said stylus is located.

16. The structure of claim 9, wherein said guide includes means readily detachably connecting the same to said tone arm.

17. The structure of claim 9, there being a common means on said tone arm mounting said stylus and said guide.

18. The combination with a dual tip type of sound pick-up cartridge wherein said cartridge carries two longitudinally spaced and aligned styluses and is pivoted to a tone arm or the like between such styluses so either stylus may be selectively engaged with a groove of a sound record; a guide for preventing lateral displacement of said styluses out of said groove, means mounting said guide on said cartridge between said styluses, said guide being shorter than said styluses, said guide extending into said groove in spaced relation thereto irrespective of which stylus is operatively seated in said groove.

References Cited in the file of this patent

UNITED STATES PATENTS

| | | |
|---|---|---|
| 1,959,923 | Harrison | May 22, 1934 |
| 2,497,366 | Nicole | Feb. 14, 1950 |
| 2,773,692 | Dunnivan | Dec. 11, 1956 |